Oct. 4, 1960 — O. E. SAARI — 2,954,704

SKEW AXIS GEARING

Filed April 10, 1957

INVENTOR.
Oliver E. Saari
BY Olson & Trexler
attys.

1

2,954,704
SKEW AXIS GEARING

Oliver E. Saari, Schiller Park, Ill., assignor to Illinois Tool Works, Chicago, Ill., a corporation of Illinois Filed Apr. 10, 1957, Ser. No. 651,886

6 Claims. (Cl. 74—466)

This invention is concerned generally with the art of gearing, and more particularly with non-parallel, non-intersecting axis gears of the type commonly known as skew axis gears.

In my prior Patent No. 2,696,125, I disclosed skew axis gearing wherein the gears obtain the highest possible amount of contact and operate at the maximum efficiency possible under the circumstances. These gears are the strongest, quietest and most efficient gears known in their field. In accordance with the foregoing patent, a gear set comprises a tapered worm or pinion, and a complementary cooperating face gear. Generally speaking, the practical lower limit of gear reduction of the gears in the aforesaid patent is of the order of 10 to 1.

The skew axis gearing as disclosed in this application is similar to that in my aforesaid patent, but is capable of use in installations in which the gearing of my aforesaid patent would be impossible or impractical, particularly in instances when a relatively low reduction ratio is needed. The gearing forming the subject matter of this invention is particularly advantageous when it is desired to transmit relatively low power at fairly low reduction ratios, although usable at higher ratios, with limited space requirements, and particularly when it is desired that there should be no backlash.

Accordingly, it is an object of this invention to provide an improved skew axis gearing.

More particularly, it is an object of this invention to provide a skew axis gearing having a cylindrical pinion of constant lead in which the teeth are unsymmetrical.

Figure 1:
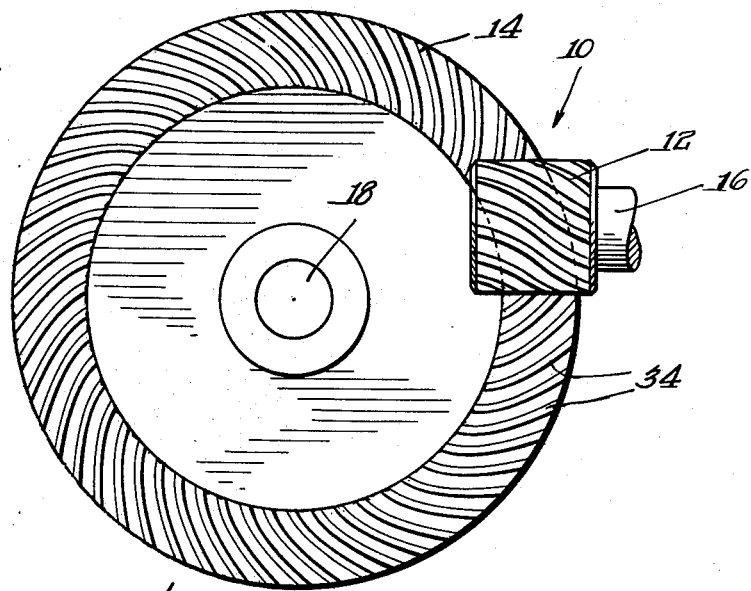
Figure 2:
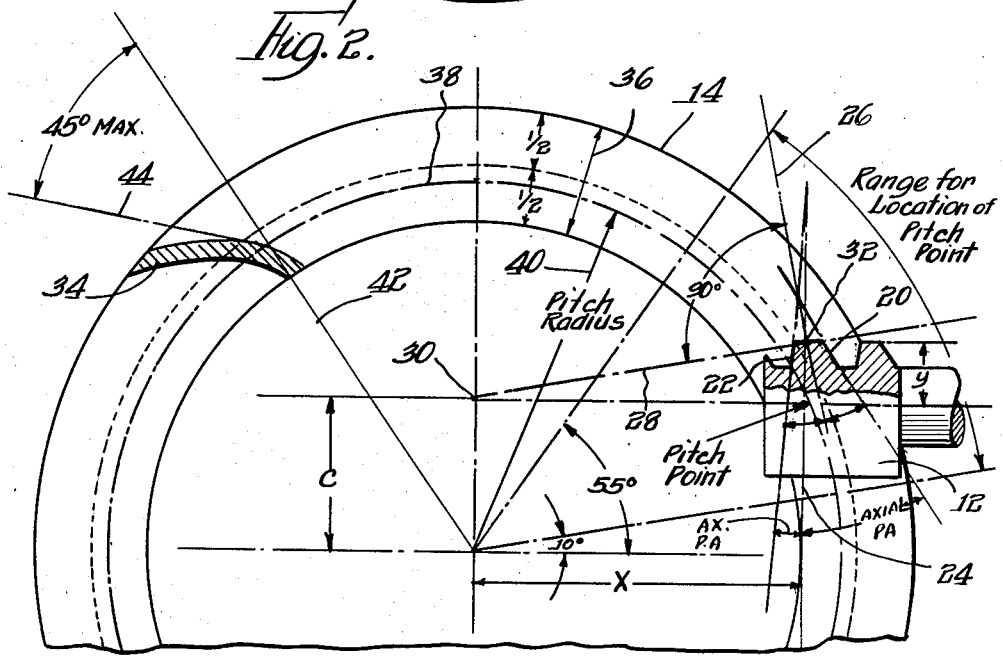

Other and further objects and advantages of the present invention will be apparent from the following description when taken in connection with the accompanying drawings wherein:

Fig. 1 is a plan view of skew axis gearing as constructed in accordance with the principles of this invention; and Fig. 2 is a view generally similar to Fig. 1, but on an enlarged scale, and showing certain relations between the pinion and the face gear meshing therewith.

Referring now in greater particularity to the drawings, there will be seen a skew axis gearing generally designated by the numeral 10 and comprising a worm or pinion 12 and a face gear 14. The pinion 12 is mounted on a shaft 16, and the face gear 14 is mounted on a shaft 18. The pinion 12 is cylindrical, and the shafts 16 and 18 are located at right angles to one another, but do not intersect, or more specifically the axes of the gears do not intersect, since the diameters of the shafts could be great enough to cause a partial intersection of the projections of the shafts. As will be seen in the drawings, the axis of the pinion 12 is offset from the center line of the gear 14. Generally speaking, the lower the reduction ratio, the closer the position of the pinion to the center line of the gear, and in any event the pinion is never displaced an exceedingly great distance from the center line. The pinion is close to the hypoid position.

The pinion is the primary member in the sense that all calculations are applied to it, and in this connection the pitch of the teeth or threads is calculated similarly to that in my aforesaid application 2,696,125. In this instance, the formula is $$L = \frac{2\pi C}{K - \frac{x}{y}}$$

In this formula, $L$ equals lead. $K$=speed ratio, and this in turn=the ratio of the teeth in the gear to the number of threads in the pinion. In the equation, $C$ is the distance from the center line of the gear (parallel to the axis of the pinion) out to the pitch point of the gear, as is noted in Fig. 2. This is the vertical dimension as illustrated in Fig. 2. $x$ represents the horizontal dimension from the center of the gear out to the pitch point of the gear along the axis of the pinion, and $y$ represents the radius of the pinion.

The pinion is cylindrical, and the teeth are of constant lead. However, the profile of the teeth is unsymmetrical. There is a low pressure angle on one side, and a high pressure angle on the other side. Specifically, the high pressure angle is on the driving side, as indicated at 20, while the low pressure angle is on the reverse side, as indicated at 22. The low pressure angle is selected between zero and 20°, while the high pressure angle is selected from 20° to 40°. It will be observed that the two pressure angles are taken with respect to a line 24 which is perpendicular to the axis of the pinion. However, the total included angle is substantially symmetrical relative to a line indicated at 26, and hereinafter designated at the limit pressure angle line. It will be observed that the limit pressure angle line 26 is perpendicular to a line 28 which extends from the intersection 30 of the projected axis of the pinion 12 with a plane lying in the axis of the gear and perpendicular to the axis of the pinion, to the intersection 32 of the limit pressure angle line 26 with the circumference of the pinion 12. It will be understood that the intersecting point 32 lies on an axial plane of the pinion taken perpendicular to the axis of the gear.

Line 28 represents the line joining the pitch point and the intersection point 30 of the pinion axis with the common perpendicular between the axes. It is possible to show, by a rather involved mathematical analysis, that a helicoidal pinion having a lead determined by the formula heretofore set forth, and having an axial profile section perpendicular to this line 28 would have tooth action analogous to zero pressure angle in conventional parallel axis gearing. Pinion teeth having pressure angles symmetrical to this limit angle, and differing from it by a substantial amount, will tend to have similar tooth action on both sides.

The teeth of the gear 14 are indicated at 34, and the face width of the gear teeth is indicated by the line 36. The pitch line 38, having the pitch radius 40, is always on the inner half of the gear face, whereby the pitch point is on the inner half of the gear face and at the outside diameter of the pinion. I have found it desirable that pitch line 38 should always be on the inner half of the gear face to assure maximum conjugate action of the pinion teeth and the gear teeth. From the nature of the pinion and gear teeth here disclosed, maximum tooth contact will only occur when the pitch radius 40 is less than the radius of the midpoint of the gear face. Generally speaking, the lower the speed ratio of the gear ($K$ in the formula aforementioned), the more drastic is the deleterious effect on conjugate action of gear and pinion teeth of the non-location of the pitch line on the inner half of the gear face. If, for example, the pitch radius 40 is on the outer half of the gear face, undesirable fillets will occur in proportion to the speed ratio of the teeth. As will be observed from the formula $$L = \frac{2\pi C}{K - \frac{x}{y}}$$

with other factors fixed, the higher the speed ration (K) of the gearing, the less practical effect the dimensions $$\frac{x}{y}$$

have on the resultant gear and pinion action. However, it is true that in all cases that the values for $x$ and $y$ in the formula and as initially determined by the pitch line 38 (and particularly at the lower speed ratios K), will have an influence on the amount of active tooth surfaces. The range for location of the pitch point is from 10° to 55° above the center line of the gear parallel to the axis of the pinion, as is indicated in Fig. 2.

It will be observed in the drawings that the teeth of the gear in axial view are of concave, convex configuration. Furthermore, when the pinion is turned to rotate the gear in the convex direction of the gear teeth, the radially inner ends of the gear teeth lead the radially outer ends thereof.

It previously has been noted that the lower the ratio, the closer the position of the pinion to the center line of the gear. No hard and fast relationship exists which cannot be varied to some extent, but it may be stated that the combination of offset center position, ratio, and pinion and gear diameters must not result in a spiral angle on the gear which exceeds 45°, this angle being between a radius 42, and the line 44 passing through the intersection of the radius 42 and the pitch circle 38, and tangent to the gear tooth 34 at that point.

The pinion may be formed in accordance with known practices, and at least for some reduction ratios, the gear may be cut by a hob similar to the pinion. For certain reduction ratios the sliding action between the pinion and the gear is rather slight, the contact mostly being a rolling contact. In such instances, it is not practical as a production question to hob the gears. Accordingly, an original gear can be hobbed, and this can be used for making a mold for subsequently molding or sintering gears. As in my prior Patent 2,696,125 previously referred to, there is a line contact completely across the face of the tooth. Substantially no fillets or undercuts are formed, and a film of oil is wiped along the gear and pinion to provide excellent lubrication. The line contact, from tip to root of the teeth, is always present in a plurality of teeth. Thus, there is a continuous motion with no discontinuities, and the gearing is quite strong. The gears can be assembled for zero backlash operation, and this is important in many applications.

The principles and the specific embodiment of the invention as heretofore set forth are for illustrative purposes. Various changes will no doubt occur to those skilled in the art, and are to be understood as forming a part of this invention insofar as they fall within the spirit and scope of the appended claims.

The invention is claimed as follows:

1. Skew axis gearing comprising a face gear and a pinion meshing therewith, said pinion being cylindrical and offset from the center line of said gear, and said pinion having teeth of constant lead and unsymmetrical pressure angles, said pressure angles being substantially symmetrical about the "limit pressure angle," said "limit pressure angle" being represented by a line passing through the projection of the pitch point of the pinion onto the circumference of the pinion on the side remote from the gear axis and in the axial plane of the pinion perpendicular to the gear axis, said "limit pressure angle" being perpendicular to a line in said pinion axial plane through said projection and through the projected intersection of the pinion axis with the axial plane of said gear perpendicular to said pinion axis.

2. Skew axis gearing as set forth in claim 1 wherein the offset of the pinion from the center line of the gear varies in accordance with the reduction ratio of the gearing and with the pinion and gear diameters; the offset of the pinion, the reduction ratio, and the diameters of the pinion and gear being so related that the spiral angle of the teeth on the gear is no greater than substantially 45°.

3. Skew axis gearing comprising a face gear and a pinion meshing therewith, said pinion being cylindrical and offset from the center line of said gear, and said pinion having teeth of constant lead and unsymmetrical pressure angles, wherein the lead of the pinion teeth is calculated in accordance with the formula $$L = \frac{2\pi C}{K - \frac{x}{y}}$$

wherein $L$=lead; $C$=the distance on the common perpendicular between the axis of the gear and the pinion; $K$=speed ratio=number of teeth in gear/number of teeth in pinion; $x$=distance along axis of pinion from pitch point of pinion to axial plane of gear perpendicular to pinion axis; and $y$=radius of pinion.

4. Skew axis gearing as set forth in claim 3 wherein the face gear has a ring of concave-convex teeth, the spiral angle of the teeth on the gear being such that the radially outer portions of the gear teeth trail the radially inner portions with the gear rotated in the convex direction of the gear teeth.

5. The gearing set forth in claim 1 wherein the pitch point of the pinion is located relative to the gear face so that it falls within the radially inner one-half of the gear face.

6. The gearing set forth in claim 3 wherein the pitch point of the pinion is located relative to the gear face so that it falls within the radially inner one-half of the gear face.

References Cited in the file of this patent

UNITED STATES PATENTS

| | | |
|---|---|---|
| 1,192,227 | Rendano | July 29, 1916 |
| 2,311,006 | Trbojevith | Feb. 16, 1943 |
| 2,696,125 | Saari | Dec. 7, 1954 |